US012389511B2

(12) United States Patent
Cahalane

(10) Patent No.: US 12,389,511 B2
(45) Date of Patent: Aug. 12, 2025

(54) LOW POWER STANDBY MODE FOR LUMINAIRE

(71) Applicant: Electronic Theatre Controls, Inc., Middleton, WI (US)

(72) Inventor: David J. Cahalane, Dane, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 283 days.

(21) Appl. No.: 18/173,471

(22) Filed: Feb. 23, 2023

(65) Prior Publication Data

US 2023/0341099 A1 Oct. 26, 2023

Related U.S. Application Data

(60) Provisional application No. 63/333,855, filed on Apr. 22, 2022.

(51) Int. Cl.

*H05B 47/105* (2020.01)
*H05B 47/17* (2020.01)
*F21W 131/406* (2006.01)

(52) U.S. Cl.

CPC .......... *H05B 47/105* (2020.01); *H05B 47/17* (2020.01); *F21W 2131/406* (2013.01)

(58) Field of Classification Search

CPC .... H05B 47/105; H05B 47/17; H05B 47/175; H02J 9/00; F21W 2131/406

See application file for complete search history.

(56) References Cited

U.S. PATENT DOCUMENTS 8,901,823 B2 * 12/2014 Scapa .................... H05B 47/11 315/131
2004/0140777 A1 7/2004 Fosler
(Continued)

FOREIGN PATENT DOCUMENTS

CN 2678305 Y 2/2005
CN 203446078 U 2/2014
(Continued)

OTHER PUBLICATIONS

United Kingdom Patent Office Search Report for Application No. 2304283.1 dated Sep. 13, 2023 (04 pages).
(Continued)

*Primary Examiner* — Henry Luong
(74) *Attorney, Agent, or Firm* — Michael Best & Friedrich LLP

(57) ABSTRACT

A luminaire including a first power supply, a second power supply, a light source, a switching circuit, and a controller. The controller is in communication with the first power supply, the second power supply, and the switching circuit. The controller can control the switching circuit to remove a supply power from the first power supply, such that the second power supply provides power to the controller, in response to determining that the luminaire is operating in a standby mode, and control the switching circuit to provide the supply power to the first power supply, such that the first power supply provides power to the controller, in response to receiving a command to operate the luminaire in a normal operating mode, wherein the first power supply is capable of outputting more power than the second power supply.

25 Claims, 5 Drawing Sheets

(56) References Cited

U.S. PATENT DOCUMENTS

| | | | | |
|---|---|---|---|---|
| 2007/0159006 | A1* | 7/2007 | Lee | H02J 9/005 307/17 |
| 2010/0225240 | A1 | 9/2010 | Shearer et al. | |
| 2011/0279091 | A1* | 11/2011 | Jung | H02J 9/005 320/137 |
| 2016/0359358 | A1 | 12/2016 | Jeong | |
| 2017/0303369 | A1* | 10/2017 | Thosteson | H05B 47/16 |
| 2019/0342447 | A1* | 11/2019 | Ko | H04M 1/72454 |

FOREIGN PATENT DOCUMENTS

| | | | |
|---|---|---|---|
| EP | 2670223 | A2 | 12/2013 |
| EP | 3313154 | A1 | 4/2018 |

OTHER PUBLICATIONS

German Patent Office Search Report and Written Opinion for Application No. 102023109776.8 dated Feb. 15, 2024 (16 pages with English machine translation).

* cited by examiner

LOW POWER STANDBY MODE FOR LUMINAIRE

CROSS-REFERENCE TO RELATED APPLICATIONS

This application claims priority to U.S. Provisional Patent Application No. 63/333,855, filed on Apr. 22, 2022, which is hereby incorporated by reference in its entirety.

FIELD OF THE INVENTION

The present invention relates to luminaires and to systems for controlling a low power standby operating mode of a luminaire.

SUMMARY

The invention provides, in one aspect, a system for controlling a low power standby operating mode of an entertainment luminaire. In the event the luminaire is operating in a standby operating mode, the luminaire is configured to limit current surge events from a main power supply and power on sequentially with a plurality of luminaires via a controller. The luminaire exhibits a reduction in power consumption when the luminaire is in standby operating mode when compared to traditional, switching device-controlled luminaires.

The invention provides, in another aspect, a luminaire including a first power supply, a second power supply, a light source configured to receive an amount of power from the first power supply, a switching circuit, and a controller. The controller is in communication with the first power supply, the second power supply, the light source, and the switching circuit. The controller is configured to control the switching circuit to remove a supply power from the first power supply, such that the second power supply provides power to at least a portion of the controller, in response to determining that the luminaire is operating in a standby mode. The controller is further configured to control the switching circuit to provide the supply power to the first power supply, such that the first power supply provides power to the controller, in response to receiving a command to operate the luminaire in a normal operating mode, wherein the first power supply is capable of outputting more power than the second power supply.

In some aspects, in response to receiving the command to operate the luminaire in a normal operating mode, the controller may provide a delay command to the switching circuit, such that the switching circuit delays providing the supply power to the first power supply by a period of time to limit an inrush current event.

In some aspects, during the normal operating mode, the first power supply provides power to the light source, and the light source operates at a plurality of visual light intensities.

In some aspects, during the normal operating mode, the first power supply provides power to the light source, and the light source operates at a plurality of colored light intensities.

In some aspects, during the standby operating mode, the switching circuit prevents the controller and the light source from receiving supply power from the first power supply, preventing the controller and the light source from receiving supply power from the first power supply includes only supplying the supply power to the second power supply.

In some aspects, the standby operating mode reduces power consumption of the controller and the luminaire. In some aspects, the power consumption during the standby operating mode is less than 0.5 W.

In some aspects, during the normal operating mode, the controller provides full operational power to the luminaire. In some aspects, full operational power during the normal operating mode is greater than an amount of power supplied during the standby operating mode.

In some aspects, the controller receives a user input indicative of entering a sleep mode. The controller enters the sleep mode in response to receiving the user input. The controller receives a wake-up signal and exits the sleep mode based on a wake-up time in response to the wake-up signal being less than a predetermined time.

In some aspects, the luminaire includes a base and a lamp assembly connected to the base. In some aspects, the light source is located within the lamp assembly.

In some aspects, the controller is located within the lamp assembly.

In some aspects, the controller is located outside of the lamp assembly.

In some aspects, the controller determines that a transition from the standby mode to the normal operating mode is necessary. The controller controls the switching circuit to apply the transition from the standby mode to the normal operating mode.

The invention provides, in another aspect, a method for operating a luminaire. The method includes supplying power to a controller via a first power supply or a second power supply and supplying, via the controller, a control signal to a switching circuit indicative of operating a luminaire in a standby mode or a normal operating mode. In response to determining that the luminaire is operating in the standby mode, the controller applies a control signal to the switching circuit to provide power to the controller via the second power supply. In response to receiving a command to operate the luminaire in the normal operating mode, the controller applies a control signal to the switching circuit to provide power to the controller via the first power supply.

In some aspects, the method includes providing, in response to receiving the command to operate the luminaire in the normal operating mode, a delay command to the switching circuit, such that the switching circuit delays providing the supply power to the first power supply by a period of time to limit an inrush current event.

In some aspects, the first power supply is capable of outputting more power than the second power supply.

In some aspects, the method includes determining that a transition from the standby mode to the normal operating mode is necessary and controlling the switching circuit to apply the transition from the standby mode to the normal operating mode.

In some aspects, the method includes providing, during the normal operating mode, power to a light source. The method includes operating, during the normal operating mode, the light source at a plurality of visual light intensities.

In some aspects, the method includes providing, during the normal operating mode, power to a light source. The method includes operating, during the normal operating mode, the light source at a plurality of colored light intensities.

In some aspects, the standby operating mode reduces power consumption of the controller and the luminaire. In some aspects, the power consumption during the standby operating mode is less than 0.5 W In some aspects, the method includes providing, during the normal operating mode, full operational power to the luminaire, the full operational power during the normal operating mode is greater than an amount of power supplied during the standby operating mode.

In some aspects, the method includes receiving a user input indicative of entering a sleep mode. The method includes entering the sleep mode in response to receiving the user input. The method includes receiving a wake-up signal and exiting the sleep mode based on a wake-up time in response to the wake-up signal being less than a predetermined time In some aspects, the method includes maintaining the light source powered off in response to the wake-up time being greater than the predetermined time, and during the sleep mode, the light source of the luminaire is powered off.

In some aspects, the method includes transitioning, via the controller, the sleep mode to a super-low sleep mode in response to not receiving the wake-up signal.

In some aspects, the method includes receiving a user input from the control board and exiting the super-low sleep mode in response to receiving the user input. During the super-low sleep mode, all non-essential functions of the luminaire are powered off, the non-essential functions include at least one selected from the group consisting of display systems and menu systems.

Other aspects of the invention will become apparent by consideration of the detailed description and accompanying drawings.

DETAILED DESCRIPTION OF THE DRAWINGS

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Figure 1:
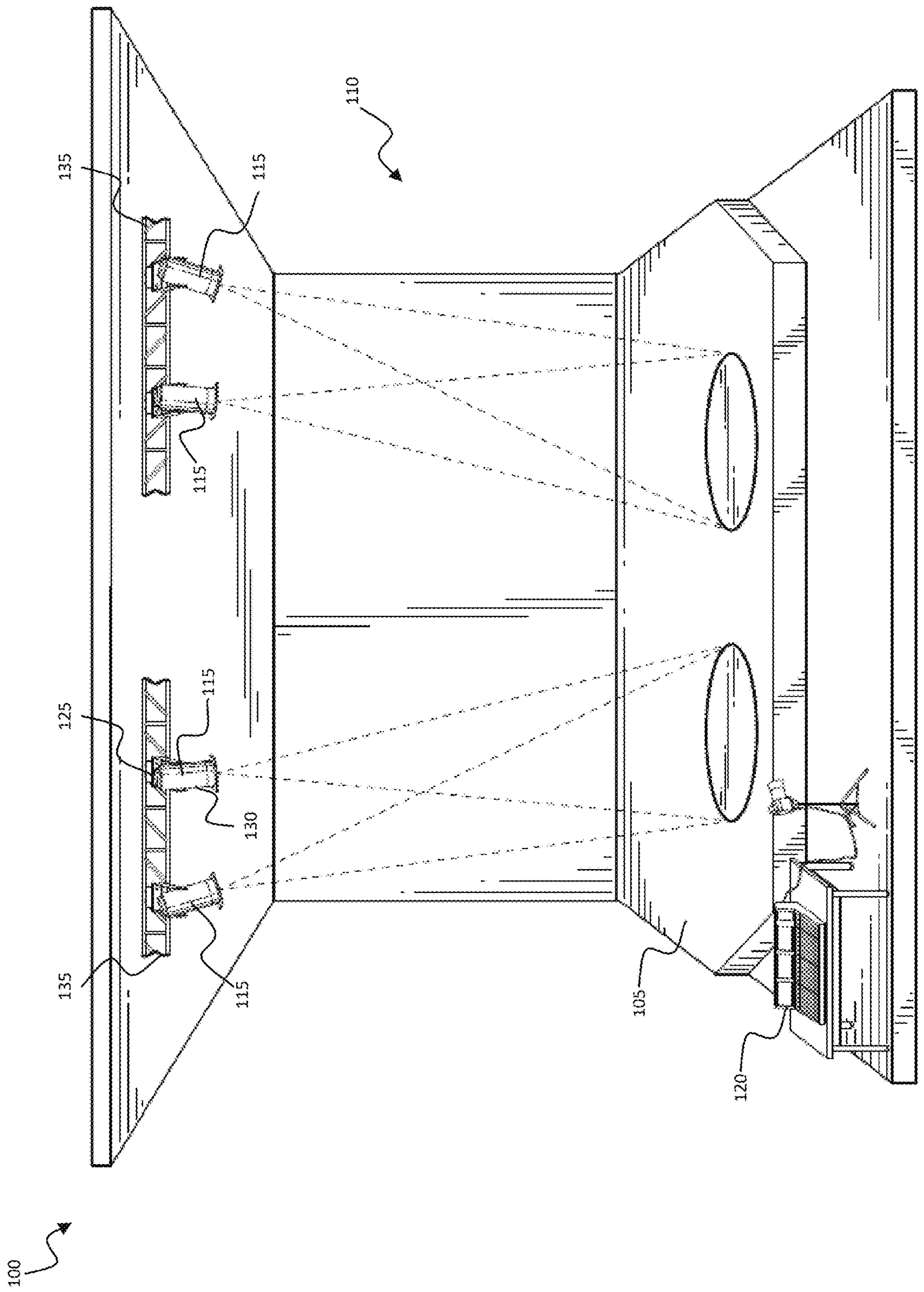
FIG. 1 illustrates a system including a luminaire in a venue, according to one example.
Figure 2:
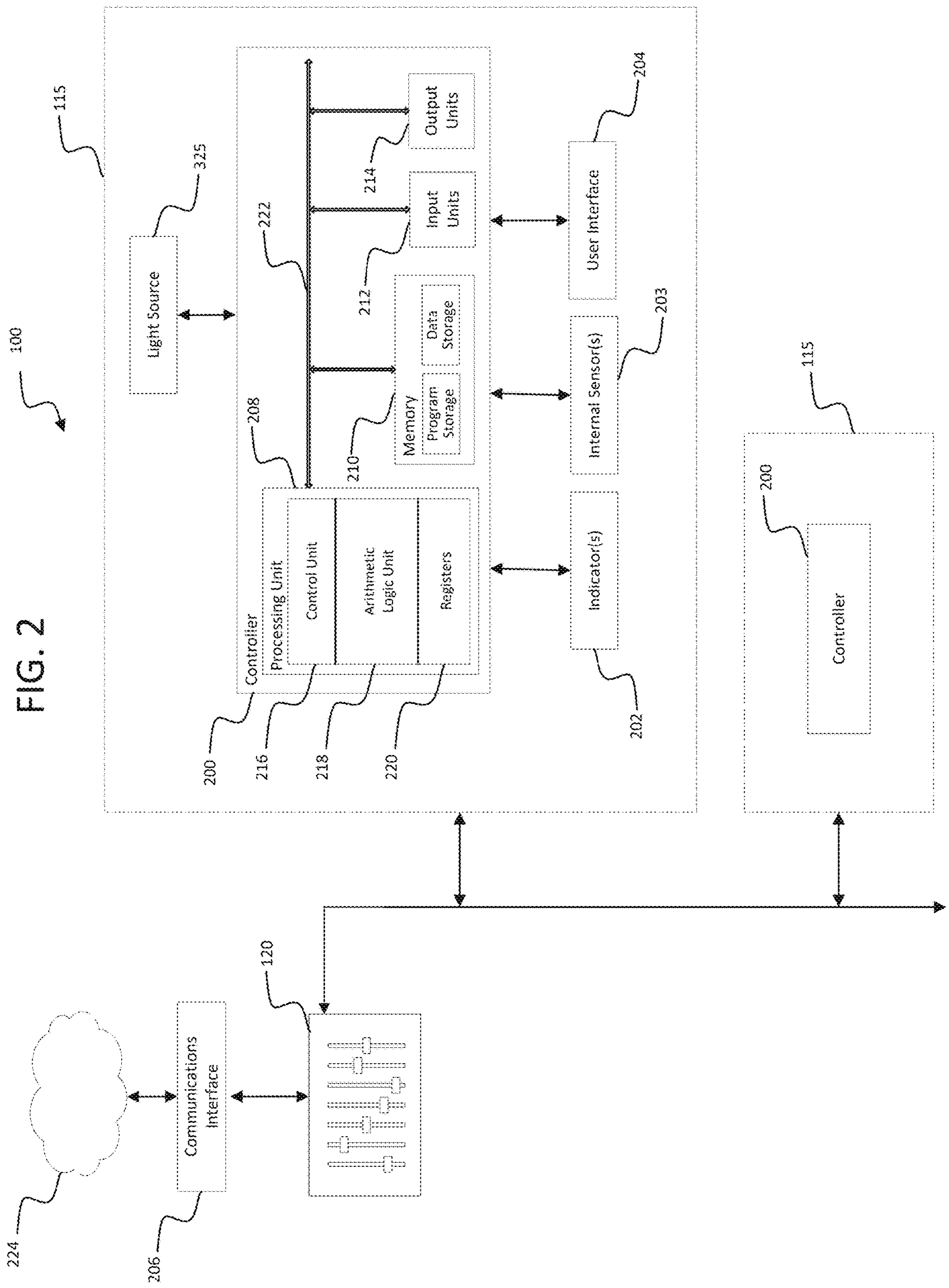
FIG. 2 is a schematic view of a controller for the luminaire of FIG. 1, according to one example.

FIGS. 1 and 2 illustrate a lighting system 100 capable of illuminating portions of a stage 105 in a venue 110. The lighting system 100 includes a plurality of luminaires 115 and a control board 120 in communication with one or more of the luminaires 115 to control their operation. Each of the illustrated luminaires 115 includes a base 125 and a lamp assembly 130. The lamp assembly 130 includes a light source 325 (e.g., an incandescent lamp, LED, LED array, arc lamp, or any other suitable light source; further described below with reference to FIG. 3). The lamp assembly 130 also includes one or more enclosures, lenses, filters, mirrors, and the like, enabling the lamp assembly 130 to project light onto the stage 105. In the illustrated embodiment, each of the luminaires 115 is mounted on a support bar 135 that is suspended above the stage 105. In other embodiments, one or more of the luminaires 115 may be mounted to other suitable structures at any desired position in the venue 110. In alternative embodiments, the lamp assembly 130 is movable relative to the base 125 (e.g., pan and tilt). In such embodiments, each of the illustrated luminaires 115 includes an electric motor in communication with the control board 120 such that the control board 120 can control the orientation of the lamp assembly 130 relative to the base 125.

With continued reference to FIG. 1, the illustrated control board 120 is a lighting control board located within the venue 110. Alternatively, the control board 120 may be positioned elsewhere within the venue 110, remote from the venue 110, or may be integrated partially or completely into one or more of the luminaires 115. In some embodiments, the control board 120 may be electrically and/or communicatively connected to a separate controller, as further described below with reference to FIG. 2.

FIG. 2 illustrates a controller 200 for the luminaire 115. The controller 200 is included within the luminaire 115. In the illustrated embodiment, the controller 200 is disposed within the lamp assembly 130. The controller 200 is electrically and/or communicatively connected to a variety of modules or components of the luminaire 115. For example, the illustrated controller 200 may be connected to one or more indicators 202 (e.g., LEDs, a liquid crystal display ["LCD"], etc.), one or more internal sensors 203, and a user input or user interface 204. The controller 200 is also communicatively connected to the control board 120. In some embodiments, the illustrated control board 120 may be connected to a communications interface 206. The communications interface 206 is connected to a network 224 to enable the control board 120 to communicate with a server. In some embodiments, the controller 200 may communicate with the server to receive communications from the control board 120. The controller 200 includes combinations of hardware and software that are operable to, among other things, control the operation of the system 100, control the operation of the luminaire 115, communicate over the network 224, communicate with the control board 120, receive input from a user via the user interface 204, provide information to a user via the indicators 202, etc. In the embodiment illustrated in FIG. 2, each luminaire 115 includes a controller 200. In some embodiments, the indicators 202 and the user interface 204 are integrated together in the form of, for instance, a touch-screen. In some embodiments, the one or more internal sensors 203 includes an occupancy sensor. The occupancy sensor senses movement within a distance range of the luminaire 115.

The controller 200 includes a plurality of electrical and electronic components that provide power, operational control, and protection to the components and modules within the controller 200 and/or the luminaire 115. For example, the controller 200 includes, among other things, a processing unit 208 (e.g., a microprocessor, a microcontroller, or another suitable programmable device), a memory 210, input units 212, and output units 214. The processing unit 208 includes, among other things, a control unit 216, an arithmetic logic unit ("ALU") 218, and a plurality of registers 220 (shown as a group of registers in FIG. 2), and is implemented using a known computer architecture (e.g., a modified Harvard architecture, a von Neumann architecture, etc.). The processing unit 208, the memory 210, the input units 212, and the output units 214, as well as the various modules or circuits connected to the controller 200 are connected by one or more control and/or data buses (e.g., common bus 222). The control and/or data buses are shown generally in FIG. 2 for illustrative purposes. The use of one or more control and/or data buses for the interconnection between and communication among the various modules, circuits, and components would be known to a person skilled in the art in view of the embodiments described herein. It should further be understood that the specific modules, circuits, and components disclosed herein for controller 200 are exemplary, and are not essential for an embodiment of the invention. In some embodiments, the controller 200 is implemented partially or entirely on a semiconductor (e.g., a field-programmable gate array ["FPGA"] semiconductor, an application specific integrated circuit ["ASIC"], or other programmable semiconductor devices as appropriate for a given application).

The memory 210 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 208 is connected to the memory 210 and executes software instructions that are capable of being stored in a RAM of the memory 210 (e.g., during execution), a ROM of the memory 210 (e.g., on a generally permanent basis), or another non-transitory computer readable medium such as another memory or a disc. Software included in the implementation of the luminaire 115 and controller 200 can be stored in the memory 210 of the controller 200. The software includes, for example, firmware, one or more applications, program data, filters, rules, one or more program modules, and other executable instructions. The controller 200 is configured to retrieve from the memory 210 and execute, among other things, instructions related to the control processes and methods described herein. In other embodiments, the controller 200 includes additional, fewer, or different components.

The user interface 204 may be included to provide user control of the system 100 and the luminaire 115. The user interface 204 is operably coupled to the controller 200 to control, for example, control or drive signals provided to the luminaire 115. The user interface 204 can include any combination of digital and analog input devices required to achieve a desired level of control for the system 100. For example, the user interface 204 can include a computer having a display and input devices, a touch-screen display, a plurality of knobs, dials, switches, buttons, faders, or the like. In the embodiment illustrated in FIG. 2, the user interface 204 is separate from the control board 120. In other embodiments, the user interface 204 is included in the control board 120.

The controller 200 is configured to work in combination with the control board 120 to provide direct control or drive signals to the luminaires 115. As described above, in some embodiments, the controller 200 is configured to provide direct control or drive signals to the luminaire 115 without separately interacting with the control board 120. The direct drive signals that are provided to the luminaire 115 are provided, for example, based on a user input received by the controller 200 from the user interface 204.

Figure 3:
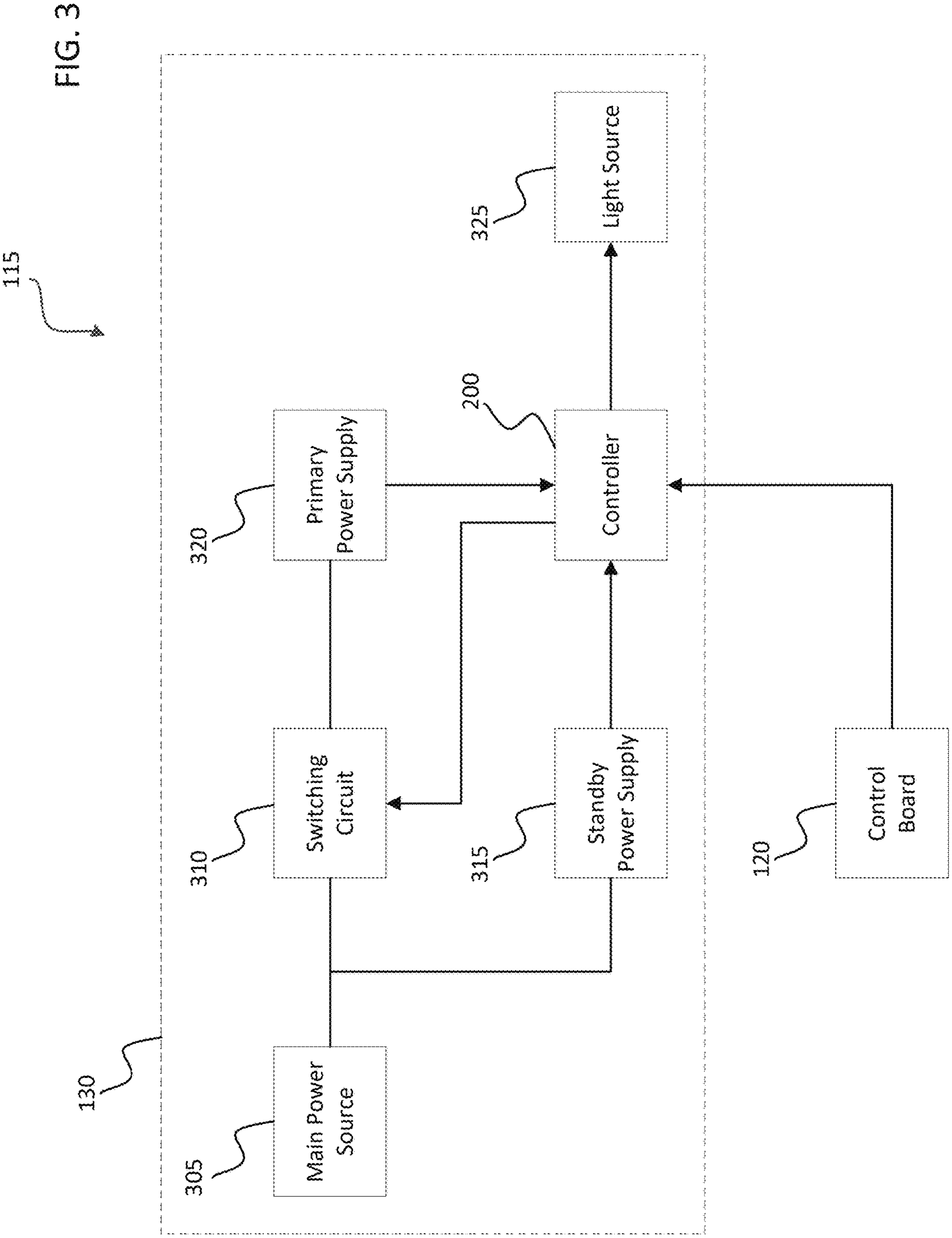
FIG. 3 is a block diagram of the luminaire of FIG. 2, according to one example.

FIG. 3 illustrates the luminaire 115 including a main power source 305 in electronic communication with a switching circuit 310 and a standby power supply 315. In some embodiments, the main power source 305 is an AC power supply, such as an AC utility power supply, or any other power supply able to provide a suitable amount of output power. In some embodiments, the switching circuit 310 is located within the main power source 305. The switching circuit 310 may encompass various types of switching circuitry. For example, the switching circuit 310 may be a relay, a silicon-controlled rectifier (SCR), an ideal diode, a transistor (e.g., a MOSFET) or any other type of suitable switching circuitry. Although the standby power supply 315 is illustrated as being in electronic communication with the main power source 305, the standby power supply 315 may be separate from the main power source 305 entirely (e.g., in electronic communication with a separate power source). In further embodiments, the standby power supply 315 may be a battery. As will be described in more detail below, the switching circuit 310 is configured to control power from the main power source 305 to a primary power supply 320. In some embodiments, the switching circuit 310, the standby power supply 315, and the primary power supply 320 are included within a single unit. In some embodiments, the switching circuit 310 controls power from the main power source 305 to the primary power supply 320 based on a signal received from the one or more internal sensors 203. For example, the one or more internal sensors 203 sense movement within the distance range of the luminaire 115 (e.g., using the occupancy sensor) and transmits a signal indicative of the movement to the controller 200. In response to receiving the signal indicative of movement, the controller 200 transmits a signal to turn on the main power source 305 to supply power to the primary power supply 320.

The standby power supply 315 is in electronic communication with the controller 200 of the luminaire 115. As shown in FIG. 3, the controller 200, the main power source 305, the switching circuit 310, the standby power supply 315, and the primary power supply 320 are located within the lamp assembly 130 of the luminaire 115. As shown in FIG. 3, the controller 200 is in electronic communication with the control board 120. In one embodiment, the controller 200 may communicate with the control board 120 via a communication link or circuit. In some examples, the controller 200 may communicate with the control board 120 via a wireless communication protocol, such as Wi-Fi, cellular (e.g., 3G, 4G, 5G, LTE, CDMA, or the like), Z-Wave, Zigbee, Bluetooth, Bluetooth Low Energy, Wi-Max, Lo-Ra, NFC, and/or other wireless communication protocols as required for a given application. In other examples, the controller 200 may communicate with the external controller using a wired communication protocol, such as Ethernet, RS-232, USB, USB 2.0, Firewire, DMX-512, RDM, ACN, CANBus, or other wired communication protocol as required for a given application.

As described above relative to FIG. 1, each luminaire 115 is a lighting device including the light source 325. As shown in FIG. 3, the light source 325 is located within the lamp assembly 130 of the luminaire 115. In some embodiments, the main power source 305 is in electronic communication with the luminaire 115. In some embodiments, the controller 200 is configured to supply power to the light source 325 of the luminaire 115. In some embodiments, the light source 325 of the luminaire 115 is configured to operate at a variety of visual light intensities and a variety of colored light intensities. Further, the light source 325 may be able to be controlled to vary in color as well as intensity. The controller 200 is further configured to control the light source 325 of the luminaire 115 to produce a variety of lighting operations and a variety of visual effects.

The control board 120 may be independent of the controller 200 and may encompass various types of communication circuitry or components. For example, the communication circuit may be a digital multiplex controller (DMX-512) or any other suitable external control device. The control board 120 is configured to provide the controller 200 with a plurality of control signals to control the lighting operations and the visual effects of the LEDs 325.

The controller 200 is further configured to control the switching circuit 310 to operate in a primary operation or standby operation condition. In the standby operation condition, the switching circuit 310 is configured to prevent power from the main power source 305 from being applied to the primary power supply 320. Accordingly, the main power source 305 supplies power to the standby power supply 315 only, which in turn is the sole provider of power to the controller 200. In some embodiments, the standby power supply 315 supplies 5V to the controller 200. In other embodiments, the standby power supply 315 is configured to supply the controller 200 with any suitable voltage to power the controller 200. In some embodiments, the standby power supply 315 is a rechargeable battery source or the like. In such embodiments, the main power source 305 may receive a signal indicative of the standby power supply 315 having a low battery capacity. For example, the main power source 305 receives the signal indicative of low battery capacity from the standby power supply 315. In other examples, the main power source 305 receives the signal indicative of low battery capacity from the controller 200, the switching circuit 310, or the control board 120. In response to receiving the signal indicative of low battery capacity, the main power source 305 turns on and supplies power to the standby power supply 315 to recharge the standby power supply 315. The standby power supply 315 may be configured as a low-power power supply. For example, the standby power supply 315 may only be capable of outputting approximately 1 W of output power. However, output power levels of more than 1 W or less than 1 W are also contemplated as required for a given application. In some embodiments, the standby power supply 315 is sized to allow the controller 200 and/or luminaire 115 to have sufficient power to perform various background operations or other functions while in standby operating mode. This allows the standby power supply 315 to provide efficient power to the controller 200 as the losses across the smaller power supply will be lower than a larger power supply, such as the primary power supply 30 described herein.

The controller 200 may be configured to control the switching circuit 310 to operate in the standby operation condition where the light source 325 is off standby operating mode and the controller 200 is operating in a controller standby operating mode. When operating in the controller standby operating mode, the controller 200 may be configured to perform only basic functions, such as communication with other devices, such as the control board 120, or perform other background operations. For example, while in the controller standby operating mode the controller 200 continues to receive and process data from the control board 120 via the plurality of control signals. In some embodiments, the power consumption of the controller 200 and/or luminaire 115 in the standby operating mode may be 0.5 W or less and may include any losses associated with the standby power supply 315.

While the controller 200 is operating in the standby operating mode, the controller 200 may determine that a mode change to a normal operating mode required. In the normal operating mode, the light source 325 of the luminaire 115 is operating and generating light based on one or more control signals from the controller 200. In some examples, the control board 120 may provide an instruction to the controller 200 to switch to the normal operating mode. In some embodiments, the controller 200 may include one or more instructions or commands to determine when the transition to the normal operating mode needs to occur. For example, in a programmed lighting routine, it may be known when a specific luminaire, such as luminaire 115, is needed to illuminate. Accordingly, the controller 200 may initiate the transition to the normal operating mode prior to the required transition time to prevent any latency of operation due to switching between the standby operating mode and the normal operating mode. In some embodiments, the transition time to the normal operating mode from the standby operating mode may be short enough such that the latency is unimportant. The controller 200 may initiate the transition to the normal operating mode when the transition is required, rather than in advance. For example, the reception of a DMX-512 signal instructing luminaire 115 to emit light may trigger the transition.

Upon determining that a transition to the normal operating mode is required, the controller 200 may provide a control signal to the switching circuit 310 to switch to a normal operating condition, wherein the switch is closed (e.g., power is provided from the main power source 305 to the primary power supply 320). The primary power supply 320 may be sized to provide sufficient power for the controller 200 and the luminaire 115 to operate per a required design. For example, the primary power supply 320 may be a 200 W power supply. However, values of more than 200 W or less than 200 W are also contemplated as required for a given design. In some examples, the primary power supply may output a higher voltage to the controller 200 and/or luminaire 115. For example, the primary power supply 320 may output a 56 VDC output. However, voltage outputs of more than 56 VDC or less than 56 VDC are also contemplated. In the normal operating mode, the controller 200 controls the light source 325 to operate at a variety of visual light intensities and a variety of colored light intensities via the plurality of control signals from the control board 120. The controller 200 is further configured to control the light source 325 of the luminaire 115 to produce a variety of lighting operations and a variety of visual effects via the plurality of control signals from the control board 120.

In some embodiments, the controller 200 may further be configured to perform various operations to limit a surge current event associated with transitioning from the standby operating mode to the normal operating mode. For example, in a system with multiple controllers 200 and/or luminaires 115, a large surge current may occur when multiple controller 200 and/or luminaires 115 are transitioned to the normal operating mode from the standby operating mode. In some examples, this may be due to multiple primary power supplies 320 being switched into the system (e.g., provided power from the main power source), resulting in a current inrush. This may occur where the primary power supplies 320 have various components, such as capacitors, which may cause brief surges of power when first powered up. These current surges, where sufficient current is determined to flow, may cause system issues, such as breaker tripping or fuse blowing conditions, which will require manual intervention to correct.

To reduce the effects of current inrush surges from transitioning multiple controller 200 and/or luminaires 115 from a standby operating mode to a normal operating mode, the controller 200 may be configured to provide a command to the switching circuit 310 to delay providing power to the primary power supply 320 for a period of time. In some embodiments, the period of time may be a random time interval. In other embodiments, the period of time is based on a serial number of the luminaire 115 or any other unique identifier of the luminaire 115. For example, in a large system, the controller 200 may delay controlling the switching circuit 310 to provide power to the primary power supply 320 based on the unique identifier, such that there is a sequential order in which the various primary power supplies 320 within the system are provided power from their respective switching circuits 310. In some embodiments, the period of time can be adjusted manually by a user, such as via the control board 120. In some examples, the period of time may be based on a general power up time for a specific primary power supply 320.

By delaying or staggering the provision of power to the primary power supplies 320 within a system, any current surges may be reduced. Spreading out surge current events over a period of time reduces likelihood of a fault being generated based on the current level exceeding a threshold value. For example, by staggering the provision of power to the primary power supplies 320, each luminaire 115 provides power to each light source 325 at a different time to reduce current surges through a system.

In some embodiments, the switching circuit 310 of the various primary power supplies 320 is controlled via a command from one or more controllers 200. For example, while the controller 200 of FIG. 3 is shown as controlling a single switching circuit 310 and luminaire 115, it is contemplated that in some examples a single controller 200 may control multiple switching circuits 310 and/or luminaires 115. In some examples, the control board 120 is in communication with multiple controllers 200 and configured to control each controller 200 to control the switching circuit 310 to provide power to the respective primary power supply 320 using a sequence. The sequence may be based on a lighting requirement for a given application, for maximizing efficiency, and/or based on other parameters. In some embodiments, the sequence is provided to the controller 200 using a remote device management (RDM) protocol of the control board 120. In some embodiments, the control board 120 provides commands to power on the plurality of primary power supplies 320 (and therefore the corresponding luminaires 115) in a certain order and is controlled automatically based on one or more factors, such as an address of the controller 200, a luminaire 115 identifier, random time delay intervals, or manual user inputs to the controller 200. In some embodiments, the sequence is changed for each luminaire 115 of the plurality of luminaires to account for different peak surge times. For example, different groups of luminaires may be powered on at different times in a predefined light show or presentation.

In some embodiments, the primary power supply 320 may receive power from the main power source 305 even when the luminaire 115 is not illuminating (e.g., in a standby mode). This may be appropriate where the luminaire 115 is switched off for short periods of time. This can reduce the effects of unnecessarily switching the primary power supply 320 on and off and lead to an extension of the operation life of various components typically used in power supplies, such as the primary power supply 320, which may otherwise see a reduction in operational life due to over switching. Example components may include electrolytic capacitors. However, other components are also contemplated.

In some embodiments, the controller 200 and/or luminaire 115 may be manually set to operate in a very low power sleep mode. In the very low power sleep mode, main power source 305 may be continuously energized. Continuous main power reduces the need for separate switch or relay circuit outputs controlling the main power source 305, such as remotely controlled relays or breakers. When in very low power deep sleep mode the power consumption of the system may be comparable with, or lower than, the power consumption of external remotely controlled relays or breakers thus maintaining or reducing the quiescent power load of the entire system.

Figure 4:
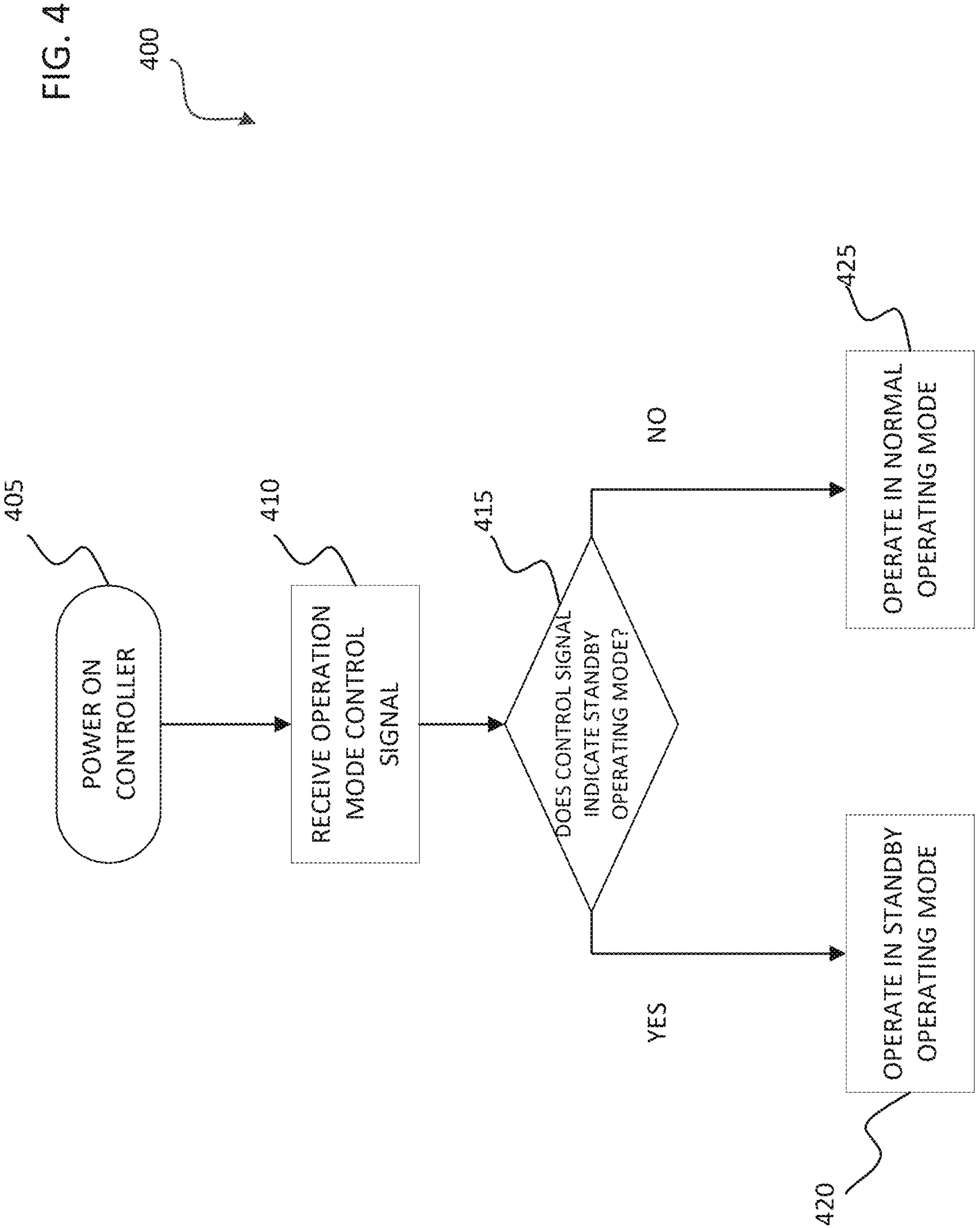
FIG. 4 is a flow chart of a method for controlling a low power standby operating mode of a luminaire, according to one example.

FIG. 4 illustrates a flow chart of a control method 400 for controlling a low power standby operating mode of the luminaire 115. The control method 400 begins at step 405 in which the main power source 305 is powered on and the controller 200 receives power from the main power source 305 via either the standby power supply 315 or the primary power supply 320, the control method 400 then proceeds to step 410. At step 410, the switching circuit 310 receives a control signal from the controller 200 to operate in the standby operating mode or the normal operating mode, the control method 400 then proceeds to step 415. As described above, the controller 200 may determine whether to operate in the standby operating mode or the normal operating mode based on a command received from the control board 120.

At step 415, where the control signal indicates whether the switching circuit 310 will operate in the standby operating mode, in response to the control signal indicating that the switching circuit 310 will operate in the standby operating mode, the control method 400 proceeds to step 420. At step 420, the controller 200 operates in the standby operating mode (e.g., instructs the switching circuitry to remove power from primary power supply). In response to the control signal indicating that the relay will operate in the normal operating mode, the control method 400 proceeds to step 425. At step 425, the controller 200 controls the switching circuit 310 to provide power to the primary power supply 320, which then supplies a control voltage to the controller 200 to provide full operational power to the controller 200 and luminaire 115. The light source 325 of the luminaire 115 may then be controlled via a plurality of control signals from the control board 120. In some examples, the controller 200 may delay controlling the switching circuit 310 to provide power to the primary power supply by a period of time to limit surge current events and reduce the power consumption of the luminaire 115, as described above. The delay duration of the luminaire 115 may be chosen to differ from the delay duration of other luminaires such that, when a plurality of luminaires each receive simultaneous commands to return to normal operating mode, each luminaire 115 will preferably delay their switching of their associated first power supplies by differing amounts of time. The delay duration may be a random delay, or a delay that is preset during luminaire manufacture, or addressing, or any other method as known in the art.

In some embodiments, the achieved reduction in power consumption is low enough to meet EnergyStar requirements. In one specific example, power consumption of the controller 200, luminaire 115, and the standby power supply 315 may be 0.265 W when operating in the standby mode. The controller 200 further comprises a sleep mode in which the LEDs are off. In some embodiments, the controller 200 receives a user input from the control board 120 or from the user interface 204 indicative of entering the sleep mode. In some embodiments, during the sleep mode, the controller 200 continues to receive and process data of the luminaire 115. The control board 120 is further configured to provide a wake-up signal to the controller 200. In some embodiments, where a wake-up time of the controller 200 in response to the received wake-up signal is less than a predetermined time, the system 300 is considered a live system (e.g., the controller 200 exits the sleep mode). Where the wake-up time is greater than a predetermined time, the light source 325 remains in the sleep mode until receiving a wake-up signal. In some embodiments, the sleep mode is extended to a super-low sleep mode. In the super-low sleep mode, all non-essential functions of the luminaire 115 are turned off (e.g., display systems and menu systems). The controller 200 wakes up from the super-low sleep mode based on a received input. For example, the input may include a user input received from the control board 120, a control signal received from the control board 120, or any valid data received by the controller 200. In some embodiments, during the super-low sleep mode, the controller 200 automatically wakes up after a predetermined time period (e.g., every 30 seconds). When the controller 200 automatically wakes up, the controller 200 determines whether the light source 325 should be turned on. When the controller 200 determines that the light source 325 should be turned on, the controller 200 returns to normal operation and the light source 325 is turned on. When the controller 200 determines that the light source 325 should remain off, the controller 200 remains in the super-low sleep mode.

Figure 5:
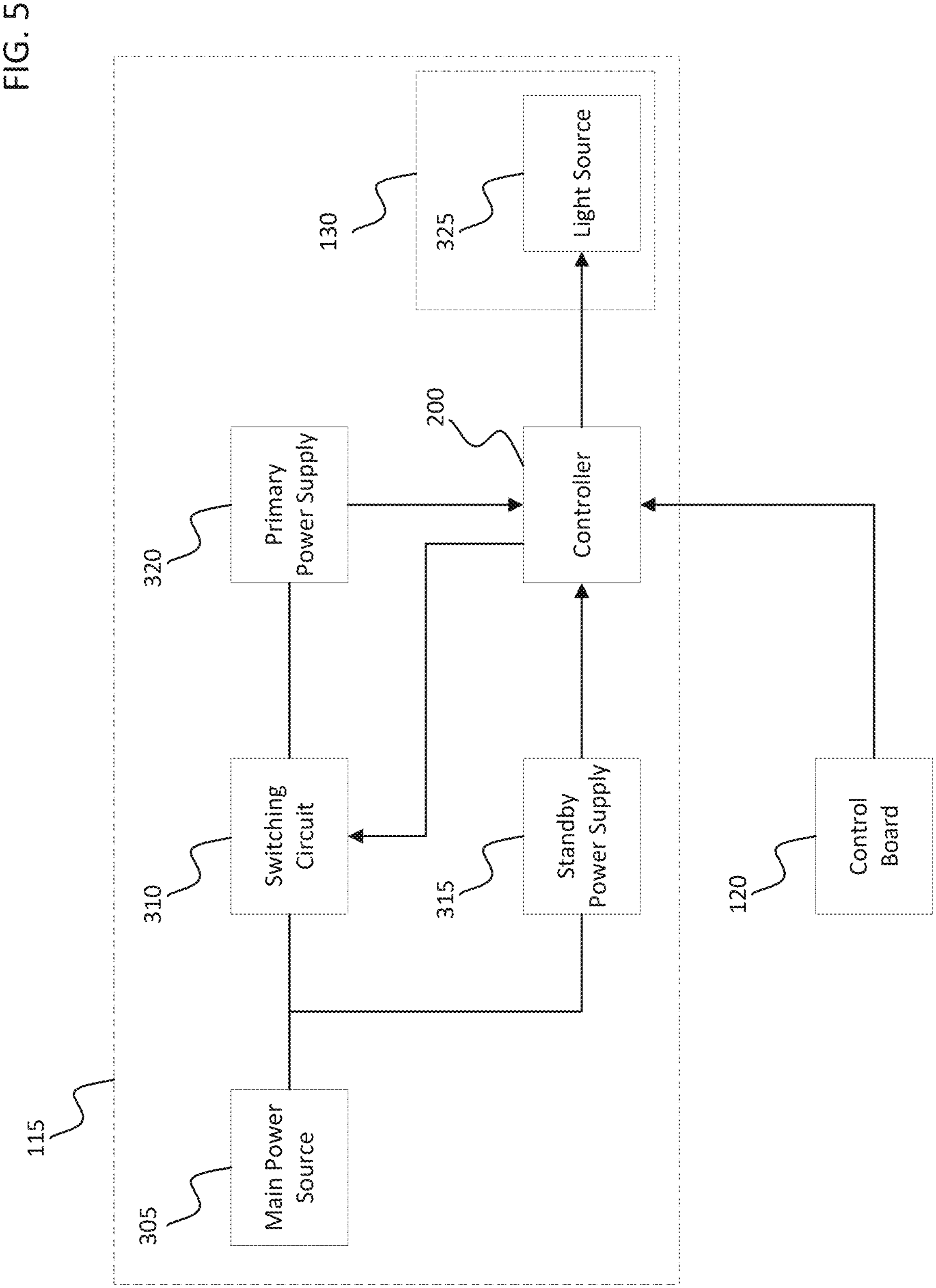
FIG. 5 is a block diagram of a luminaire according to another embodiment.

FIG. 5 illustrates the luminaire 115 including the main power source 305 in electronic communication with the switching circuit 310 and the standby power supply 315. The embodiment shown in FIG. 5 is an alternative embodiment to the embodiment of FIG. 3. The luminaire 115 of FIG. 5 is operable to perform similar functions as other embodiments described herein. As shown in FIG. 5, the light source 325 is located within the lamp assembly 130 of the luminaire 115. In such embodiments, the controller 200, the main power source 305, the switching circuit 310, the standby power supply 315, and the primary power supply 320 are located separately or outside from the lamp assembly 130 in a different location than the lamp assembly 130. For example, some or all of the controller 200, the main power source 305, the switching circuit 310, the standby power supply 315, and the primary power supply 320 may be adjacent to or in the control board 120. The controller 200 is further configured to control the switching circuit 310 to operate in a primary operation or standby operation condition, as described above. In some embodiments, the controller 200 is configured to supply power to the light source 325 of the luminaire 115, as described above. In other embodiments, the controller 200 may be included within the control board 120, and, for example, the controller 200 can provide control signals directly to the luminaire 115. In other embodiments, the controller 200 may be associated with the server and communicates through the network 224 to provide control signals to the control board 120 and the luminaires 115. In some embodiments, the controller 200 is separate from the luminaire 115.

Although the invention has been described with reference to certain preferred embodiments, variations and modifications exist within the scope and spirit of one or more independent aspects of the invention as described.

The invention claimed is:

1. A luminaire, comprising:

a first power supply, a second power supply, a light source configured to receive an amount of power from the first power supply, a switching circuit, and a controller in communication with the first power supply, the second power supply, the light source, and the switching circuit, wherein the controller is configured to:

control the switching circuit to remove a supply power from the first power supply, such that the second power supply provides power to the controller in response to determining that the luminaire is operating in a standby mode, and control the switching circuit to provide the supply power to the first power supply, such that the first power supply provides power to the controller in response to receiving a command to operate the luminaire in a normal operating mode, wherein the first power supply is capable of outputting more power than the second power supply; and wherein the controller is further configured to provide a delay command to the switching circuit, such that the switching circuit delays providing the supply power to the first power supply by a period of time to limit an inrush current event, in response to receiving the command to operate the luminaire in the normal operating mode.

2. The luminaire of claim 1, wherein during the normal operating mode, the first power supply provides power to the light source, and the light source is configured to operate at a plurality of visual light intensities.

3. The luminaire of claim 1, wherein during the normal operating mode, the first power supply provides power to the light source, and the light source is configured to operate at a plurality of colored light intensities.

4. The luminaire of claim 1, wherein during the standby operating mode, the switching circuit prevents the controller from receiving supply power from the first power supply, and wherein preventing the controller from receiving supply power from the first power supply includes only supplying the supply power to the second power supply.

5. The luminaire of claim 4, wherein the standby operating mode reduces power consumption of the controller and the luminaire, and wherein the power consumption during the standby operating mode is less than 0.5 W.

6. The luminaire of claim 5, wherein during the normal operating mode, the controller provides full operational power to the luminaire, and wherein full operational power during the normal operating mode is greater than an amount of power supplied during the standby operating mode.

7. The luminaire of claim 1, wherein the controller is further configured to:

receive a user input indicative of entering a sleep mode;

enter the sleep mode in response to receiving the user input;

receive a wake-up signal; and exit the sleep mode based on a wake-up time in response to the wake-up signal being less than a predetermined time.

8. The luminaire of claim 1, further comprising:

a base; and a lamp assembly connected to the base, wherein the light source is located within the lamp assembly.

9. The luminaire of claim 8, wherein the controller is located within the lamp assembly.

10. The luminaire of claim 8, wherein the controller is located outside of the lamp assembly.

11. The method of claim 10, the method further comprising:

providing, during the normal operating mode, power to a light source; and operating, during the normal operating mode, the light source at a plurality of visual light intensities.

12. The method of claim 10, the method further comprising:

providing, during the normal operating mode, power to a light source; and operating, during the normal operating mode, the light source at a plurality of colored light intensities.

13. The luminaire of claim 1, the controller further configured to:

determine that a transition from the standby mode to the normal operating mode is necessary; and control the switching circuit to apply the transition from the standby mode to the normal operating mode.

14. A method for operating a luminaire, the method comprising:

supplying power to a controller via a first power supply or a second power supply;

supplying, via the controller, a control signal to a switching circuit indicative of operating the luminaire in a standby mode or a normal operating mode;

controlling, in response to determining that the luminaire is operating in the standby mode, the switching circuit provide power to the controller via the second power supply; and controlling, in response to receiving a command to operate the luminaire in the normal operating mode, the switching circuit to provide power to the controller via the first power supply; and providing, in response to receiving the command to operate the luminaire in a normal operating mode, a delay command to the switching circuit, such that the switching circuit delays providing the supply power to the first power supply by a period of time to limit an inrush current event.

15. The method of claim 14, wherein the first power supply is capable of outputting more power than the second power supply.

16. The method of claim 14, the method further comprising:

determining that a transition from the standby mode to the normal operating mode is necessary; and controlling the switching circuit to apply the transition from the standby mode to the normal operating mode.

17. The method of claim 14, wherein the standby operating mode reduces power consumption of the controller and the luminaire, and wherein the power consumption during the standby operating mode is less than 0.5 W.

18. The method of claim 17, the method further comprising:

providing, during the normal operating mode, full operational power to the luminaire, wherein full operational power during the normal operating mode is greater than an amount of power supplied during the standby operating mode.

19. The method of claim 14, the method further comprising:

receiving a user input indicative of entering a sleep mode;

entering the sleep mode in response to receiving the user input;

receiving a wake-up signal; and exiting the sleep mode based on a wake-up time in response to the wake-up signal being less than a predetermined time.

20. The method of claim 19, the method further comprising:

maintain a light source powered off in response to the wake-up time being greater than the predetermined time, wherein during the sleep mode, the light source of the luminaire is powered off.

21. The method of claim 19, the method further comprising:

transitioning, via the controller, the sleep mode to a super-low sleep mode in response to not receiving the wake-up signal.

22. The method of claim 21, the method further comprising:

receiving a user input from the control board; and exiting the super-low sleep mode in response to receiving the user input, wherein during the super-low sleep mode, all non-essential functions of the luminaire are powered off, wherein the non-essential functions include at least one selected from the group consisting of display systems and menu systems.

23. A method for operating a luminaire, the method comprising:

supplying power to a controller via a first power supply or a second power supply;

supplying, via the controller, a control signal to a switching circuit indicative of operating the luminaire in a standby mode or a normal operating mode;

controlling, in response to determining that the luminaire is operating in the standby mode, the switching circuit provide power to the controller via the second power supply; and controlling, in response to receiving a command to operate the luminaire in the normal operating mode, the switching circuit to provide power to the controller via the first power supply;

receiving a user input indicative of entering a sleep mode;

entering the sleep mode in response to receiving the user input;

receiving a wake-up signal;

exiting the sleep mode based on a wake-up time in response to the wake-up signal being less than a predetermined time; and transitioning, via the controller, the sleep mode to a super-low sleep mode in response to not receiving the wake-up signal.

24. The method of claim 23, the method further comprising:

receiving a user input from the control board; and exiting the super-low sleep mode in response to receiving the user input, wherein during the super-low sleep mode, all non-essential functions of the luminaire are powered off, wherein the non-essential functions include at least one selected from the group consisting of display systems and menu systems.

25. A method for operating a luminaire, the method comprising:

supplying power to a controller via a first power supply or a second power supply;

supplying, via the controller, a control signal to a switching circuit indicative of operating the luminaire in a standby mode or a normal operating mode;

controlling, in response to determining that the luminaire is operating in the standby mode, the switching circuit provide power to the controller via the second power supply; and controlling, in response to receiving a command to operate the luminaire in the normal operating mode, the switching circuit to provide power to the controller via the first power supply;

receiving a user input indicative of entering a sleep mode;

entering the sleep mode in response to receiving the user input;

receiving a wake-up signal;

exiting the sleep mode based on a wake-up time in response to the wake-up signal being less than a predetermined time; and maintain a light source powered off in response to the wake-up time being greater than the predetermined time, wherein during the sleep mode, the light source of the luminaire is powered off.

* * * * *